United States Patent [19]
Jette

[11] Patent Number: 5,839,702
[45] Date of Patent: Nov. 24, 1998

[54] FLEXIBLE CABLE MANAGEMENT SYSTEM

[76] Inventor: Roger Jette, 17 Prospect St., Babylon, N.Y. 11702

[21] Appl. No.: 637,390

[22] Filed: Apr. 25, 1996

[51] Int. Cl.$^6$ .................................................. F16L 3/22
[52] U.S. Cl. ......................... 248/49; 248/68.1; 248/302
[58] Field of Search ................... 248/49, 68.1, 80, 248/76, 302, 52, 75

[56] References Cited

U.S. PATENT DOCUMENTS

| | | | |
|---|---|---|---|
| 1,590,910 | 6/1926 | Rumrill | 248/80 |
| 1,787,106 | 12/1930 | Glazener | 248/75 X |
| 2,620,232 | 12/1952 | King | 248/80 X |
| 2,687,329 | 8/1954 | Hunter | 248/75 X |
| 3,021,102 | 2/1962 | Kuempel | 248/80 X |
| 3,588,012 | 6/1971 | Schaefer | 248/80 |
| 3,687,406 | 8/1972 | Krahe et al. | 248/68.1 X |
| 4,068,824 | 1/1978 | Flynn | 248/75 X |
| 4,143,845 | 3/1979 | Harris | 248/302 X |
| 4,337,934 | 7/1982 | Caveney | 248/68.1 X |
| 4,596,095 | 6/1986 | Chalfant | |
| 5,477,649 | 12/1995 | Bessert | |
| 5,524,327 | 6/1996 | Mickel et al. | 248/52 X |
| 5,548,932 | 8/1996 | Mead | |

FOREIGN PATENT DOCUMENTS

| | | |
|---|---|---|
| 1615074 | 4/1970 | Germany |
| 7435122 | 10/1974 | Germany |
| 3742448 | 6/1989 | Germany |

*Primary Examiner*—Derek J. Berger
*Attorney, Agent, or Firm*—Dilworth & Barrese

[57] ABSTRACT

A cable support assembly which includes at least one elongate flexible spine member and a plurality of open ended support members mounted on the flexible spine member and spaced apart from one another such that the open ended support members define a support surface.

24 Claims, 4 Drawing Sheets

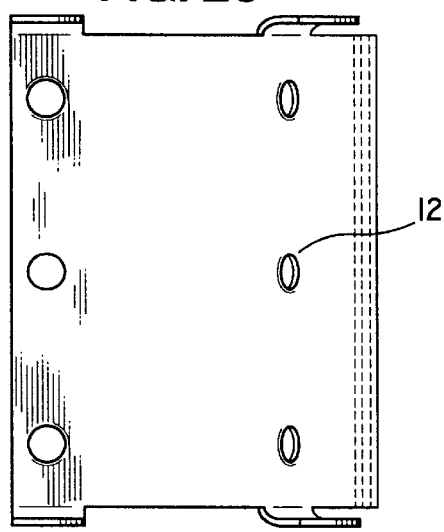
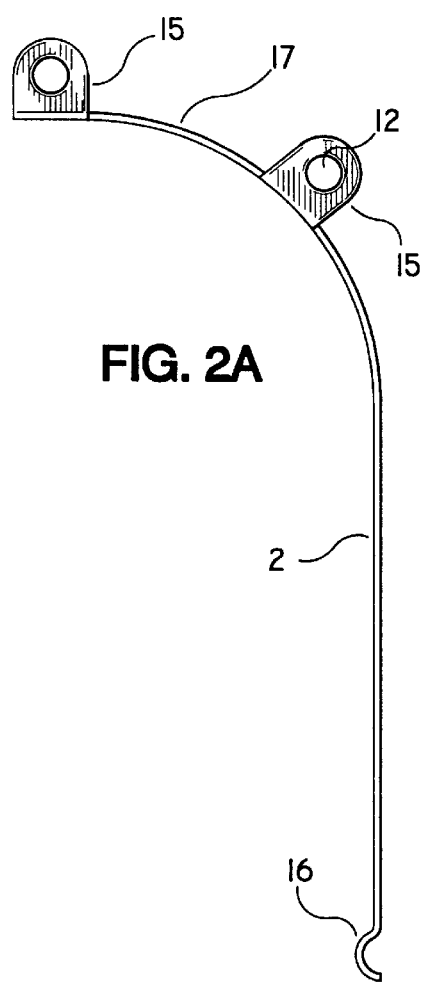
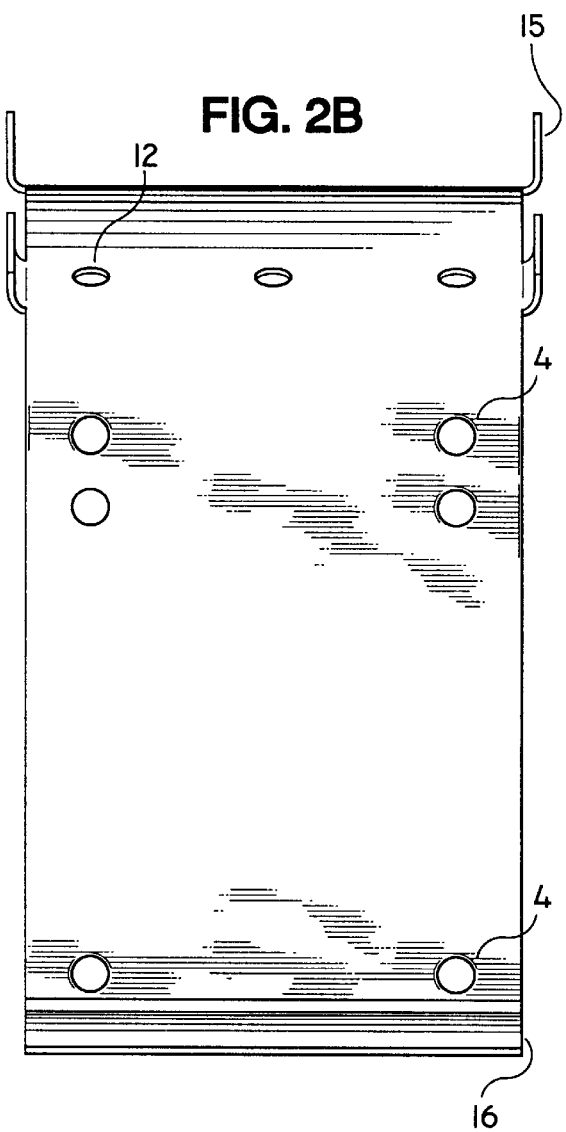

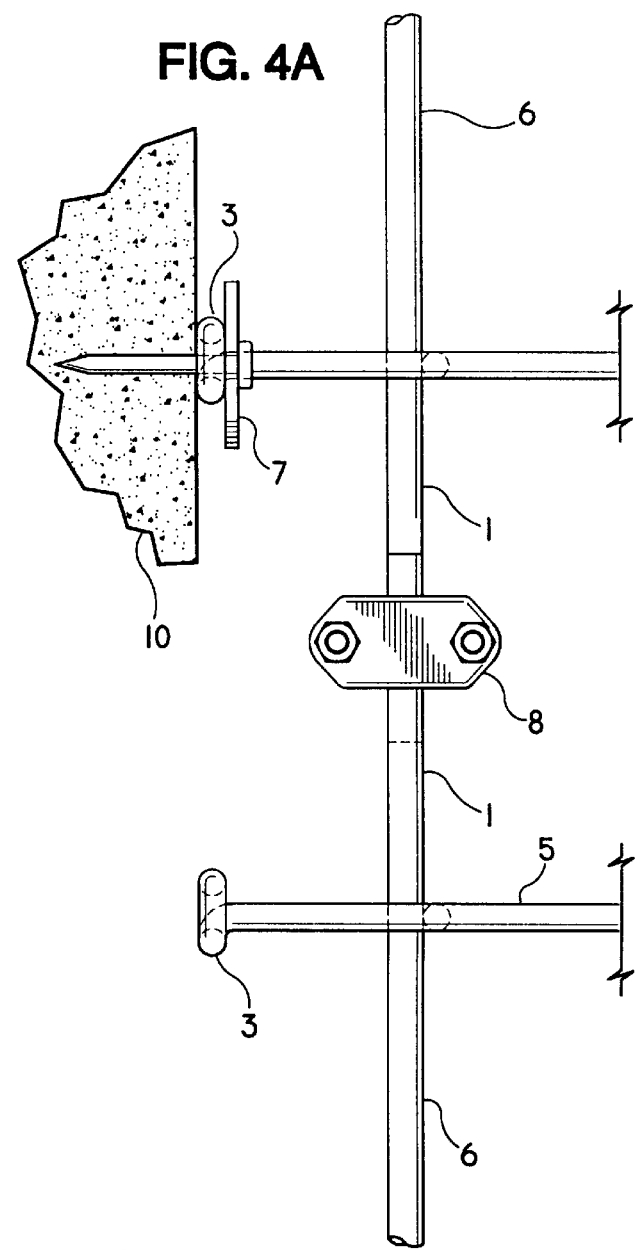
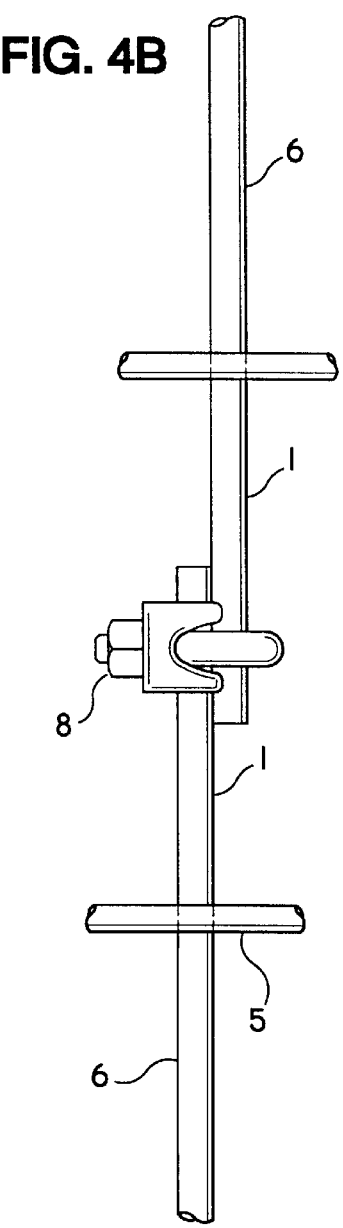
FIG. 4A
FIG. 4B
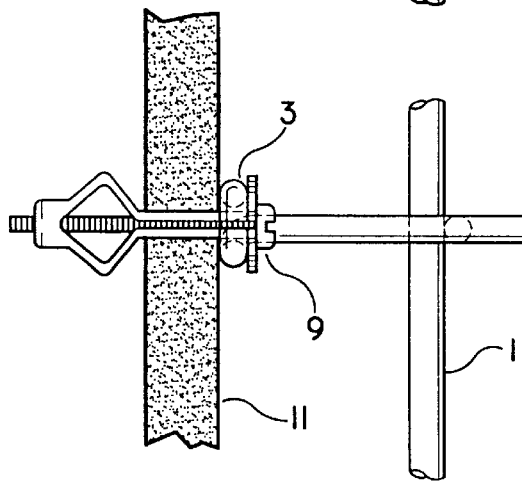
FIG. 4C

FLEXIBLE CABLE MANAGEMENT SYSTEM

BACKGROUND OF THE INVENTION

1. Field of the Invention

The present disclosure relates to cable management systems and more particularly to flexible cable management systems for cable management and installation applications.

2. Description of related art

Currently available cable management systems require the procurement and installation of turning components and transitions. The presently disclosed flexible cable management system is designed to allow for either lateral or vertical curves thus eliminating the need for turning components and transitions.

BRIEF SUMMARY OF THE INVENTION

The presently disclosed cable management system is designed to allow for the installation, organization, routing and protection of cable. It is designed in such a way as to bend into curves in either lateral or vertical directions without tools, heat, fixtures or chemical alterations and as such is different from any other product. It therefore eliminates the need to procure and to install turning components and transitions. The design of the presently disclosed cable management system with multiple fastener points, allows for single person installation. This will create significant savings in person hours for the design and installation of the invention in user installations.

Equally spaced spoke design and integrated proprietary enter/exit components allow the cable to leave the presently disclosed flexible cable management system at any point and in any direction to reach its destination. The enter/exit components are designed in such a way as to prevent copper or fiber optic cable from kinking or bending in too tight of a radius which would have a negative effect on the performance of the cables signals.

BRIEF DESCRIPTION OF THE DRAWINGS

For a better understanding of the invention, reference is made to the following description of an exemplary embodiment thereof, and to the accompanying drawing figures, wherein:

FIG. 2A is an end view of an enter/exit component;

FIG. 2B is a side view of an enter/exit component;

FIG. 2B is a side view of an enter/exit component;

FIG. 2C is a top view of an enter/exit component;

FIG. 4A is a side view of a flexible cable management system fastened to concrete;

FIG. 4B is a side view of a flexible cable management system fastened to wallboard; and FIG. 4C is a side view of two support sections connected by means of a mechanical clamp.

DETAILED DESCRIPTION

Figure 1:
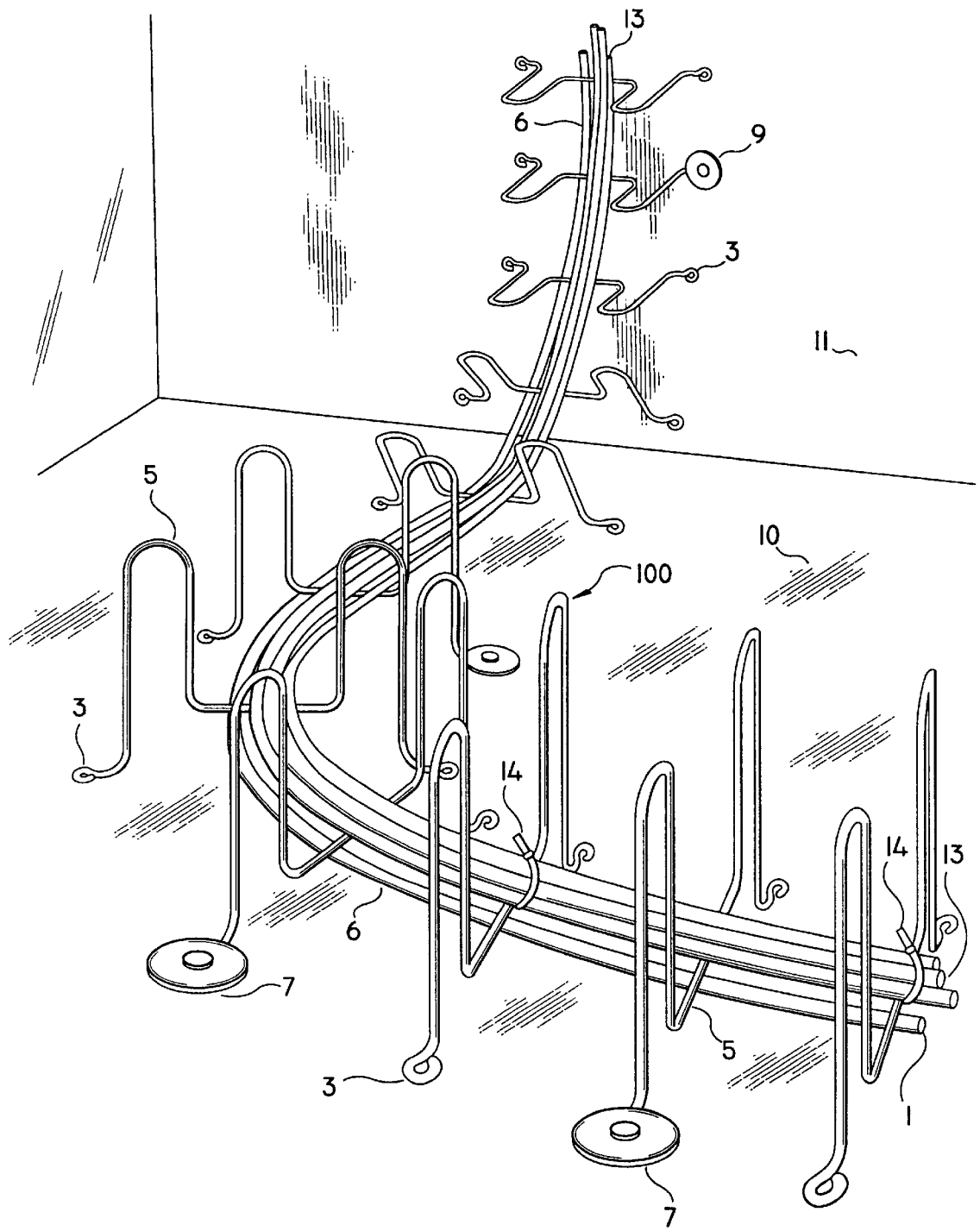
FIG. 1 is a perspective view of the flexible cable management system in accordance with the present invention.

Referring to the drawings in detail, and initially to FIG. 1, the presently disclosed flexible cable management system 100 is shown having both lateral and vertical bends formed therein. Such bends can be formed without the use of tools or other devices. Multiple fastener points 3 allow the flexible cable management system 100 to be secured in whatever position it has been bent, by means of a washered fastener 7 to a concrete surface 10 or a wall board anchor 9 to a wall board surface 11. A plurality of cables 13 are installed within the flexible cable management system and are capable of being secured to any of a plurality of spokes 5 with a standard cable fastener 14. Sections of flexible cable management system 100 can be joined together at a connector tail 1.

Referring now to FIGS. 2A, 2B and 2C, an enter/exit component 2 is illustrated in the three views. The enter/exit component 2 is indexed to the flexible cable management system 100 by means of a spoke index and secured by wire ties passed through attachment holes 4. A cable may be secured to enter/exit component 2 by means of wire ties passed through wire tie attachment holes 12 and further held in place by means of cable containment tabs 15. A cable radius 17 is formed in enter/exit component 2 to preclude the installed cable from bending too tightly or kinking.

Figure 3A:
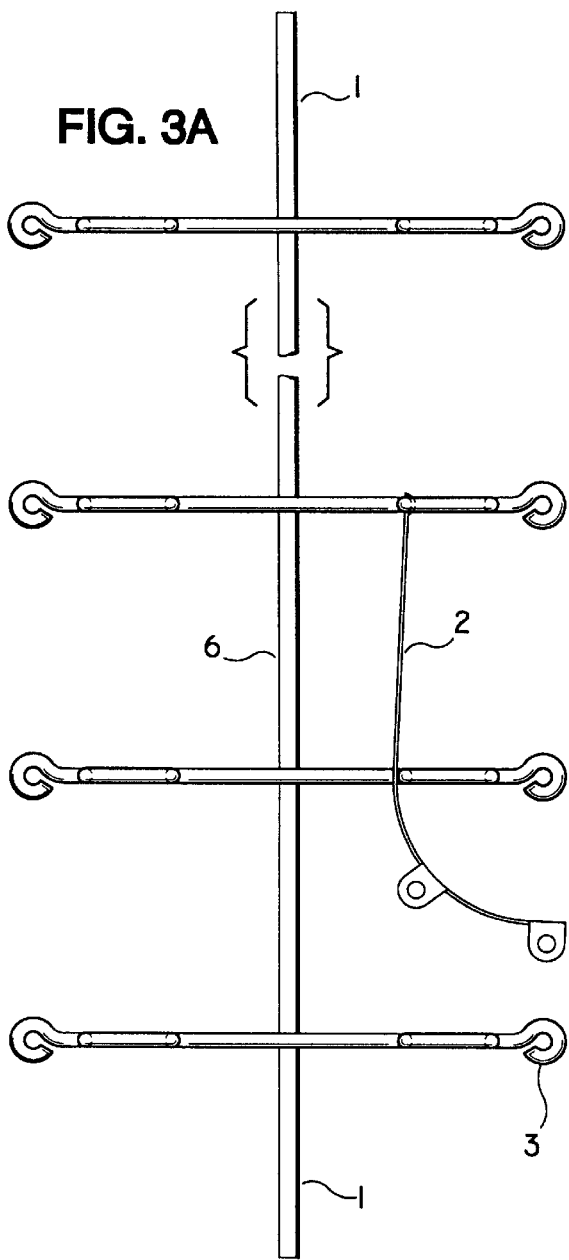
FIG. 3A is a top view of a flexible spine and a plurality of spoke members.
Figure 3B:
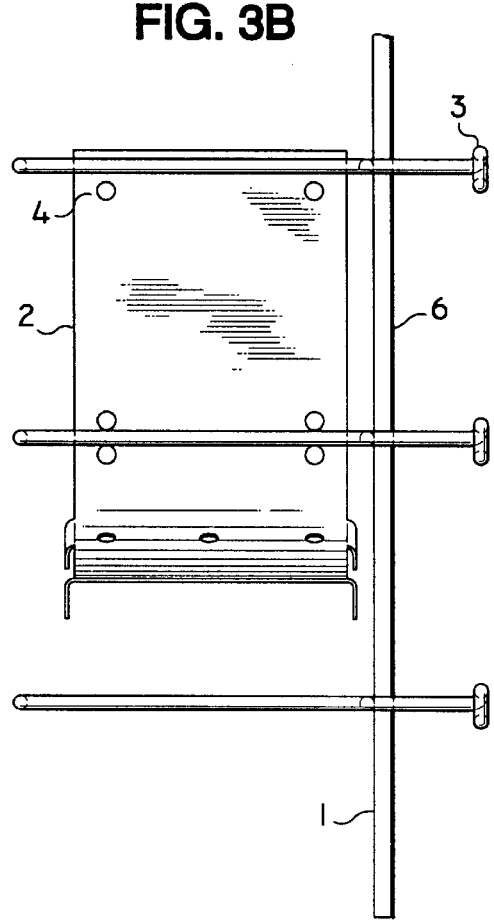
FIG. 3B is a side view of a spoke member.
Figure 3C:
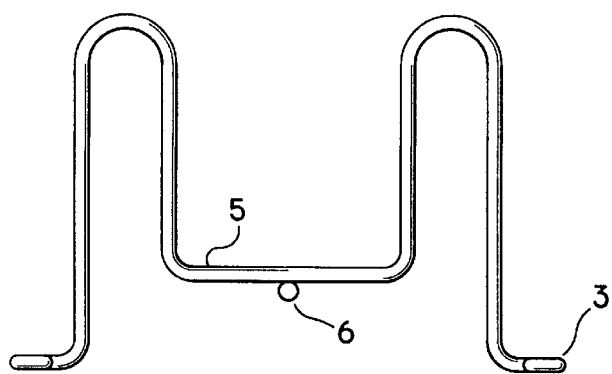
FIG. 3C is a side view of a flexible spine member having spoke members and enter/exit component installed thereon.

In FIGS. 3A, 3B and 3C, a flexible spine 6, spokes 5 and enter/exit component 2 are shown in their assembled positions.

Referring now to FIGS. 4A, 4B and 4C, various means for attaching the flexible cable management system 100 are illustrated. In FIG. 4A, flexible cable management system 100 is shown anchored to a concrete surface 10 at fastening point 3 by means of washered fastener 7. In FIG. 4B, flexible cable management system 100 is anchored to a wall board 11 at a fastener point 3 by means of a wall board fastener 9. Two support sections are shown joined together at connector tails 1 by means of a standard clamp 8, in FIG. 4C.

The flexible cable management system 100 includes of a series of formed wire spokes 5 welded to a single spine 6. The wire spokes 5 are formed in a fashion to allow the maneuvering and protection of the cables 13 that are installed in the system. Having a single spine allows the flexible cable management system 100 to be bent by hand in any direction necessary. Each spoke 5 has two fastener points 3 which allow the flexible cable management system 100 to be secured to the installation surface at multiple points along its length. Preformed proprietary enter/exit components 2 attach to spokes 5 of the flexible cable management system 100 at any point allowing the cable 13 to exit the flexible cable management system 100 without the risk of damage due to kinking. Flexible cable management system 100 is designed in such a way that it can be installed beneath raised floor, on existing floors, on walls and risers or suspended from a ceiling.

During installation, the technician will lay out the path of the cable runs on the primary floor of an installation area between the stantions of the raised floor. The technician would then place eight foot sections of the flexible cable management system 100 on the layout lines, bending by hand where necessary either laterally, up a wall or down a riser. Then, using a standard power charged stud gun and washered fasteners, randomly secure the flexible cable management system 100 to the installation area floor by means of the built in fastener rings. Anti-kink enter/exit components 2 would be installed on spokes 5 of the flexible cable management system 100 where it is necessary for cables 13 to exit the system to reach their destination. After the network of flexible cable management system 100 is completed, the technician would place copper and/or fiber optic cable into flexible cable management system 100 and randomly secure it using cable ties, to spokes 5 of flexible cable management system 100. Flexible cable management system 100 allows cable to be organized, routed and protected against crushing or kinking.

What is claimed is:

1. A modular cable support system, which comprises:
   a series of support sections, each support section including an elongate flexible spine member, and a plurality of support members attached to the elongate flexible spine member along the length thereof, the plurality of support members positioned relative one another to permit substantial bending by hand of the elongate flexible spine member in either a vertical or horizontal direction;
   at least some of the plurality of support members defining a partially enclosed area having a bottom surface disposed below an opening configured and dimensioned to receive a plurality of cables therein;
   a plurality of extended portions directed away from the opening and terminating at a point below the bottom surface of the partially enclosed area to facilitate positioning the cable support system a distance away from a surface upon which the cable support system may be positioned; and
   means for connecting the series of support sections.

2. A modular cable support system as recited in claim 1, wherein each of the elongate flexible spine members is formed as a continuous member from bendable material.

3. A modular cable support system as recited in claim 1, wherein the plurality of support members are formed from wire stock.

4. A modular cable support system as recited in claim 1, wherein the means for connecting the series of support sections includes a mechanical clamp.

5. A modular cable support system as recited in claim 1, wherein each plurality of support members is arrayed along the respective elongate flexible spine member to define a pathway to support and direct the cables.

6. A modular cable support system as recited in claim 1, wherein the elongate flexible spine member has a circular cross-section.

7. A modular cable support system as recited in claim 1, wherein each of the plurality of support members has a substantially U-shape in cross-section.

8. A modular cable support system as recited in claim 1, wherein each of the plurality of support members is attached at an intermediate portion thereof to the elongate flexible spine member.

9. A modular cable support system as recited in claim 1, wherein at least one of the plurality of extended portions includes a fastener point adapted to facilitate mounting of the cable support system to the surface upon which the cable support system may be positioned.

10. A modular cable support system as recited in claim 1, which further comprises at least one wall component attached to at least one of the plurality of support members, the at least one wall component defining a smooth transition surface to direct cables supported by the support system along a non-linear path to prevent damage to the cables.

11. A cable support apparatus, which comprises:
    an elongate flexible spine member selectively bendable into a number of different configurations;
    a plurality of support members attached to the elongate flexible spine member along the length thereof, the plurality of support members positioned relative one another to permit substantial bending by hand of the elongate flexible spine member in either a vertical or horizontal direction, the plurality of support members each defining a partially enclosed area having a bottom surface disposed below an opening configured and dimensioned to receive a plurality of cables therein;
    at least some of the plurality of support members including an extended portion directed away from the opening and terminating at a point below the bottom surface and the elongate flexible spine member to facilitate positioning the cable support apparatus a distance away from a surface upon which the cable support apparatus may be positioned.

12. A cable support apparatus as recited in claim 11, wherein the plurality of support members are arrayed along the elongate flexible spine member to define a pathway to support and direct the cables.

13. A cable support apparatus as recited in claim 11, wherein the elongate flexible spine member has a circular cross-section.

14. A cable support apparatus as recited in claim 11, wherein each of the plurality of support members have a substantially U-shape in cross-section.

15. A cable support apparatus as recited in claim 11, wherein each of the plurality of support members are attached at an intermediate portion thereof on the elongate flexible spine member.

16. A cable support apparatus as recited in claim 11, wherein at least one of the extended portions includes a fastener point adapted to facilitate mounting of the cable support apparatus to the surface upon which the cable support apparatus may be positioned.

17. A cable support apparatus as recited in claim 11, which further comprises at least one wall component which defines a smooth transition surface to direct the cables supported by the apparatus along a non-linear path to prevent damage to the cables.

18. A cable support apparatus as recited in claim 11, wherein the elongate flexible spine member is solid in cross-section.

19. A cable support apparatus as recited in claim 11, wherein the plurality of support members are formed of wire stock.

20. A cable support apparatus, which comprises:
    an elongate flexible spine member selectively bendable into a number of different configurations;
    a plurality of support members attached to the elongate flexible spine member along the length thereof, the plurality of support members positioned relative one another to permit substantial bending by hand of the elongate flexible spine member in either a vertical or horizontal direction, the plurality of support members each defining a partial enclosure having a bottom surface disposed below an opening configured and dimensioned to receive and support a plurality of cables therein;
    a series of legs disposed relative to the partial enclosures of the plurality of support members and the elongated flexible spine member such that a portion of the legs extends below the bottom surface of the partial enclosure and the elongate flexible spine member to facilitate positioning the cable support apparatus a distance away from a surface upon which the cable support apparatus may be positioned.

21. A cable support apparatus as recited in claim 20, wherein the plurality of support members are arrayed along the elongate flexible spine member to define a pathway to support and direct the cables therein.

22. A cable support apparatus as recited in claim 20, wherein each of the plurality of support members are attached at an intermediate portion thereof on the elongate flexible spine member.

23. A cable support apparatus as recited in claim 20, wherein at least one of the legs includes a fastener point adapted to facilitate mounting of the cable support apparatus to a surface.

24. A cable support apparatus as recited in claim 20, which further comprises at least one wall component which defines a smooth transition surface to direct the cables supported by the apparatus along a non-linear path to prevent damage to the cables.

* * * * *

UNITED STATES PATENT AND TRADEMARK OFFICE
CERTIFICATE OF CORRECTION

PATENT NO. : 5,839,702
DATED : November 24, 1998
INVENTOR(S) : Roger Jette

It is certified that error appears in the above-identified patent and that said Letters Patent is hereby corrected as shown below:

On the Title Page, Item [56] References Cited

Add the following to the U.S. PATENT DOCUMENTS:

2,082,099  6/1935  Cruser
   2,891,750  6/1959  Berquist
   3,053,358  9/1962  Gross
   3,321,571  5/1967  Lynch
   3,363,048  1/1968  Vaughn
   4,372,510  2/1983  Skypala
   4,432,519  2/1984  Wright
   4,765,576  8/1988  Peled
   4,840,023  6/1989  Borsani
   5,123,618  6/1992  Guterman
   5,240,209  8/1993  Kutsch
   5,323,988  6/1994  Handler
   5,531,410  7/1996  Simon

UNITED STATES PATENT AND TRADEMARK OFFICE
CERTIFICATE OF CORRECTION

PATENT NO. : 5,839,702
DATED : November 24, 1998
INVENTOR(S) : Roger Jette

It is certified that error appears in the above-identified patent and that said Letters Patent is hereby corrected as shown below:

Add the following items to the FOREIGN PATENT DOCUMENTS:

| | | |
|---|---|---|
| 298825 | 11/1989 | EPO |
| 553039 | 7/1993 | EPO |
| 556137 | 8/1993 | EPO |
| 571307 | 11/1993 | EPO |
| 1540323 | 2/1970 | GERMANY |
| 2155625 | 5/1973 | GERMANY |
| 2358863 | 5/1974 | GERMANY |
| 2395449 | 1/1979 | FRANCE |

Signed and Sealed this

Fifteenth Day of June, 1999

Attest:

Q. TODD DICKINSON

Attesting Officer

Acting Commissioner of Patents and Trademarks